US006150735A

United States Patent [19]

Hisamoto

[11] Patent Number: 6,150,735

[45] Date of Patent: Nov. 21, 2000

[54] STARTER PROTECTOR

[75] Inventor: Motoi Hisamoto, Tokyo, Japan

[73] Assignee: Mitsubishi Denki Kabushiki Kaisha, Tokyo, Japan

[21] Appl. No.: 09/257,212

[22] Filed: Feb. 25, 1999

[30] Foreign Application Priority Data

Sep. 9, 1998 [JP] Japan .................................. 10-254948

[51] Int. Cl.[7] ............................... B60R 22/00; F02P 9/00; H02G 3/00

[52] U.S. Cl. .............................................. 307/10.6; 361/23

[58] Field of Search ..................................... 307/9.1, 10.6; 310/68 C, 68 R, 91; 361/23, 24, 25, 26, 27, 28

[56] References Cited

U.S. PATENT DOCUMENTS

| | | | |
|---|---|---|---|
| 4,042,860 | 8/1977 | Woods et al. | 361/25 |
| 5,729,416 | 3/1998 | Renkes et al. | 361/23 |

FOREIGN PATENT DOCUMENTS

| | | |
|---|---|---|
| 2 719 872 | 11/1995 | France . |
| 197 00 376 A1 | 1/1998 | Germany . |
| 9-105372 | 4/1997 | Japan . |

*Primary Examiner*—Stephen W. Jackson
*Assistant Examiner*—Andre Henry
*Attorney, Agent, or Firm*—Sughrue, Mion, Zinn, Macpeak & Seas, PLLC

[57] ABSTRACT

A starter protector for preventing excessive generation of heat by a starter and for preventing reactivation of the starter while the engine is running, etc., comprises an auxiliary switch for opening and closing a starter main switch, a mounting bracket having a main body portion extending circumferentially around the outer circumferential surface of a housing of the auxiliary switch and secured thereto and a pair of leg portions extending substantially parallel to each other from the main body portion before turning outwards, and a protector circuit disposed in the space formed by the leg portions for opening the auxiliary switch under predetermined conditions. The protector circuit may comprise a case which is guided and positioned by the leg portions of the mounting bracket and the case may comprise a flange capable of being secured to the starter together with the leg portions of the mounting bracket.

7 Claims, 5 Drawing Sheets

STARTER PROTECTOR

BACKGROUND OF THE INVENTION

1. Field of the Invention

The present invention relates to a starter protector for protecting a starter by preventing the continuous energizing of the starter and by preventing the reactivation of the starter while an engine or the starter is rotating under inertia or while the engine is running.

2. Description of the Related Art

A starter is activated by the action of switching on a start switch of a key switch, whereby an engine is ignited and started. Once the engine is ignited and started, the starter is deactivated by the action of switching off the start switch of the key switch. At that time, if there is any cause for deterioration of the return of the key switch, etc., the start switch may not be switched off and the starter may continue to operate even after the engine has been ignited, causing the starter to generate heat and be damaged by that heat. Also, the engine may not ignite as soon as the start switch of the key switch is switched on and if the start switch of the key switch is switched off once and immediately switched back on, the starter may be reactivated while the engine or the starter is rotating under inertia, or the starter may be activated while the engine is running, and there is a risk that a pinion gear on the starter may be damaged when it tries to engage a ring gear on the engine.

For these reasons, starter protectors are conventionally known which provide the function of preventing the excessive continuous energizing of the starter and the reactivation of the starter while the engine or the starter is rotating under inertia or while the engine is running. As an example of a circuit for such a starter protector, FIG. 4 shows a schematic diagram of a starter activation circuit incorporating a circuit for a starter protector. Examples of constructions of starter protectors incorporating the circuit are shown in FIGS. 5 and 6.

In FIG. 4, the circuit for the starter protector comprises: a circuit for an auxiliary switch 20 having a magnetizing coil 21 and contacts 22 for generally opening and closing a starter main switch; and a regulating circuit 31 for a protector circuit 30 for terminating the energizing of the magnetizing coil 21 of the auxiliary switch 20 under predetermined conditions and opening the auxiliary switch 20. The circuit 31 for a protector circuit 30 may comprise, for example, a timer circuit for terminating the energizing of the magnetizing coil 21 at a predetermined time after the key switch is switched on.

40 is a starter motor which is a direct-current motor for starting the engine; and 50 is a main switch having main contacts 52 for opening and closing the current to the starter motor 40 and a magnetizing coil 51 for opening and closing the main contacts 52. 1 is a power supply battery; and 2 is a start switch disposed in the key switch.

Next, the operation of the starter activation circuit will be explained.

When the start switch 2 is switched on, the magnetizing coil 21 is magnetized and the contacts 22 close. Next, an electric current flows through the magnetizing coil 51 and the starter motor 40 as well, and the pinion gear (not shown) meshes with the ring gear of the engine (not shown). If the pinion gear meshes with the ring gear normally, the main contacts 52 close and main current flows through the main contacts 52 to the starter motor 40 and the engine is started. When the start switch 2 is switched off, the circuit 31 is no longer energized, the contacts 22 open, and the main contacts 52 also open, stopping the operation of the starter motor 40. Also, the energizing of the magnetizing coil 21 is terminated by the circuit 31 after a predetermined time has elapsed from the switching on of the start switch 2, and similarly, the contacts 22 open and the main contacts 52 also open, stopping the operation of the starter motor 40.

FIGS. 5 and 6 are perspective views showing conventional constructions of starter protectors.

In FIG. 5, an auxiliary switch 20 comprises an approximately cylindrical housing 23 and a cap 24 having terminals 24*a* for wiring to the starter, etc. A mounting bracket 25 for securing the auxiliary switch 20 to the starter is secured by welding to the outer circumferential portion of the housing 23. A cylindrical magnetizing coil 21 (not shown) is disposed coaxial to the housing 23 within the housing 23, and contacts 22 (not shown) are disposed on the cap 24 side of the magnetizing coil 21 in a straight line with the magnetizing coil 21 in the axial direction.

A protector circuit 30 is disposed in a straight line with the auxiliary switch 20 at the opposite end of the auxiliary switch 20 from the cap 24. Lead wires 29 for connection to the circuit within the auxiliary switch 20 are disposed on the protector circuit 30 and extend over the housing 23 of the auxiliary switch 20 to the terminals 24*a* on the cap 24.

The mounting bracket 25 is a flat plate bent to a cylindrical shape to match the outer circumferential shape of the housing 23 and is secured to the case by welding. Leg portions 25*b* having flat portions with slots 25*a* for securing by screws to the starter are disposed at both ends of the mounting bracket 25.

In FIG. 6, the main difference from FIG. 5 is that the protector circuit 30 is built into the cap 24 of the auxiliary circuit 20 which comprises an approximately cylindrical housing 23 and a cap 24 having terminals 24*a* for wiring to the starter, etc.

A plan view showing a construction of a starter fitted with such a starter protector is shown in FIG. 7. A view from the direction of X in FIG. 7 is shown in FIG. 8.

A starter 60 comprises: an approximately cylindrical starter main body portion 42 having a starter motor 40 within and having flanges 41 for mounting the starter 60 on an engine (not shown); and a main switch portion 51 disposed alongside the starter main body portion having an approximately cylindrical shape smaller than the starter main body portion and having a main switch 50 within. The starter protector shown in FIG. 6 is secured by screws 11 to flange surfaces 55 disposed on the main switch portion 51. A space 27, which is dead space, is formed among the housing 23 and the mounting bracket 25 of the auxiliary switch 20 of the starter protector and the flange surfaces 55.

Starter protectors having the above construction are long in the axial direction of the starter protector and require a lot of space to mount the starter protector onto the starter. Consequently, there are a lot of restrictions on where the starter protector can be mounted onto the periphery of the starter and sometimes it is difficult to fit the starter protector directly onto the starter.

SUMMARY OF THE INVENTION

The present invention aims to solve the above problems and an object of the present invention is to provide a compact starter protector which is capable of making use of dead space not conventionally used and which is easily mounted onto a starter.

The starter protector according to the present invention is a starter protector for use together with a starter for preventing excessive generation of heat by the starter and for preventing reactivation of the starter when an engine or the starter is rotating under inertia or while the engine is running, and comprises:

an auxiliary switch for opening and closing a starter main switch;

a mounting bracket for mounting the auxiliary switch onto the starter, having leg portions each having one end secured to the auxiliary switch and the other end extending away from the auxiliary switch forming a space with the auxiliary switch and being capable of being secured to the starter; and a protector circuit disposed in the space formed by the leg portions of the mounting bracket for opening the auxiliary switch under predetermined conditions.

The starter protector according to the present invention is also characterized in that the protector circuit may comprise a case which is guided and positioned by the leg portions of the mounting bracket.

The starter protector according to the present invention is also characterized in that the case may comprise a flange capable of being secured to the starter together with the leg portions of the mounting bracket.

The starter protector according to the present invention is also characterized in that:

the auxiliary switch may comprise a housing;

the mounting bracket may comprise a main body portion extending circumferentially around at least part of the outer circumferential surface of the housing of the auxiliary switch and secured thereto;

the leg portions may be a pair of leg portions extending substantially parallel to each other from the main body portion before turning outwards; and the space may be formed between the pair of leg portions.

DETAILED DESCRIPTION OF THE PREFERRED EMBODIMENTS

Embodiment 1

Figure 1:
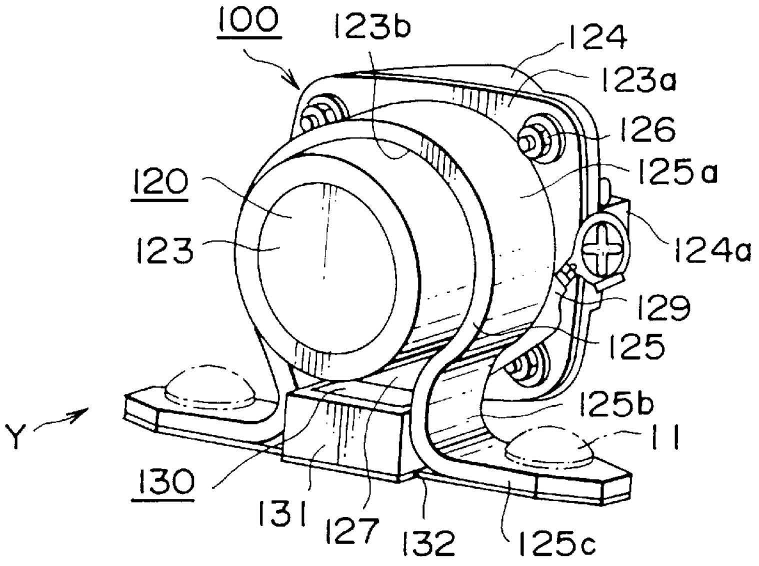
FIG. 1 is a perspective view of a starter protector according to Embodiment 1 of the present invention.
Figure 2:
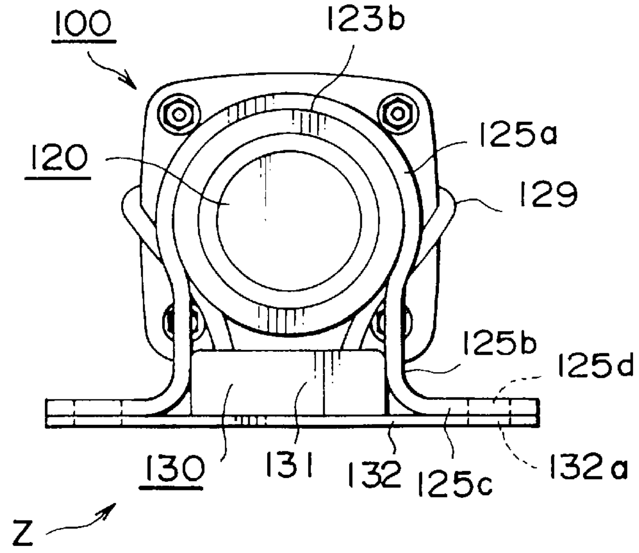
FIG. 2 is a front elevation from the direction of Y in FIG. 1.
Figure 3:
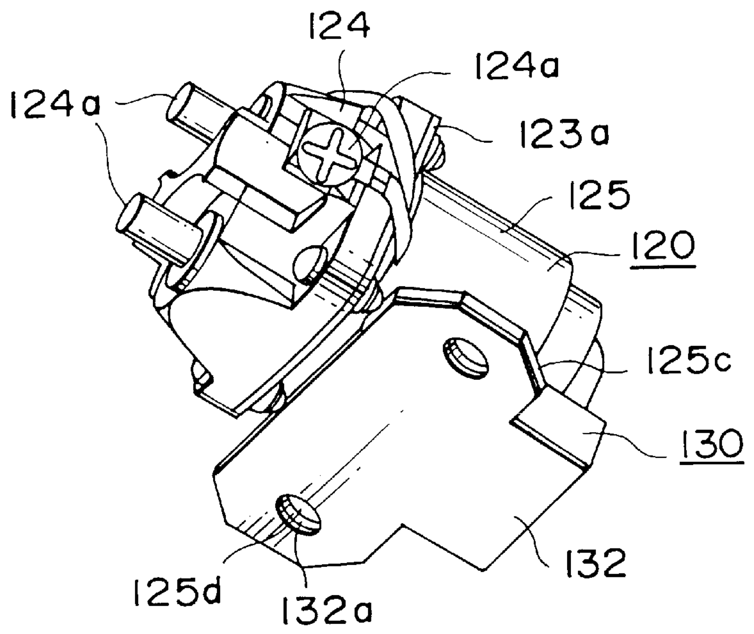
FIG. 3 is a perspective view from the direction of Z in FIG. 2.
Figure 4:
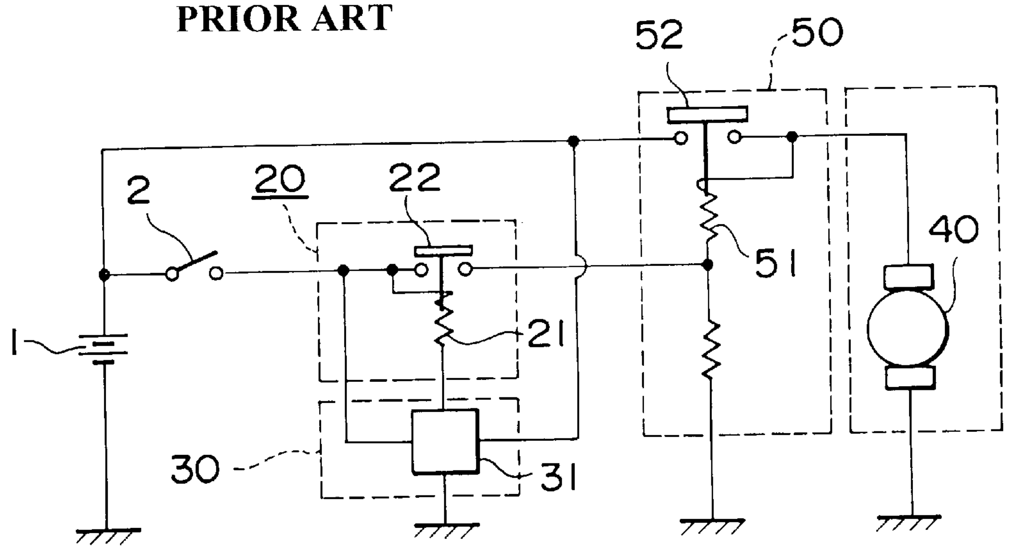
FIG. 4 PRIOR ART
FIG. 4 is a schematic diagram of a starter activation circuit incorporating a circuit for a starter protector to which the present invention can be applied.
Figure 5:
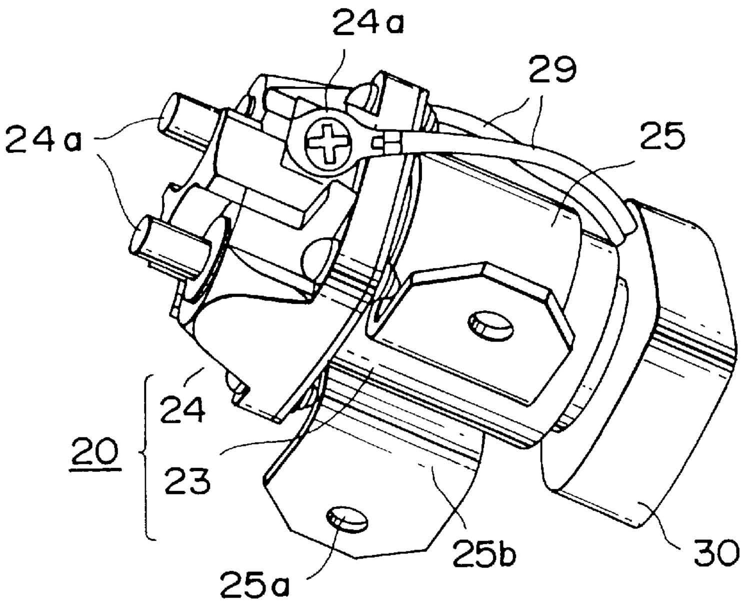
FIG. 5 PRIOR ART
FIG. 5 is a perspective view showing a construction of a conventional starter protector.
Figure 6:
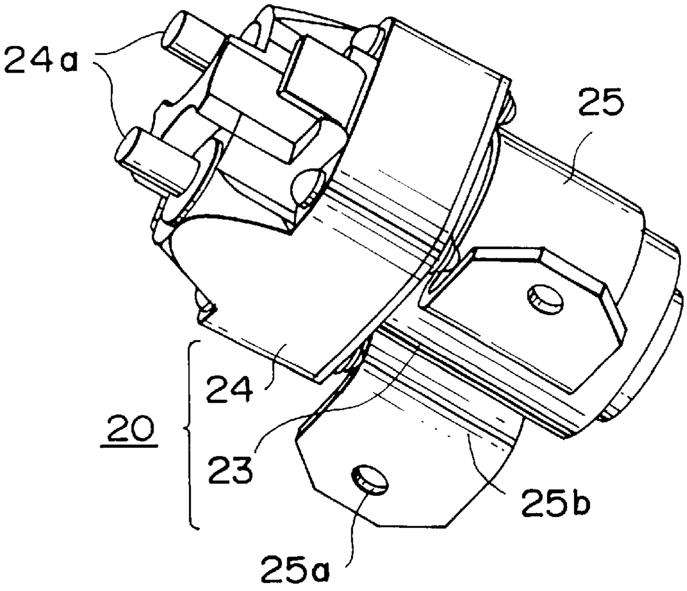
FIG. 6 PRIOR ART
FIG. 6 is a perspective view showing a construction of another conventional starter protector.
Figure 7:
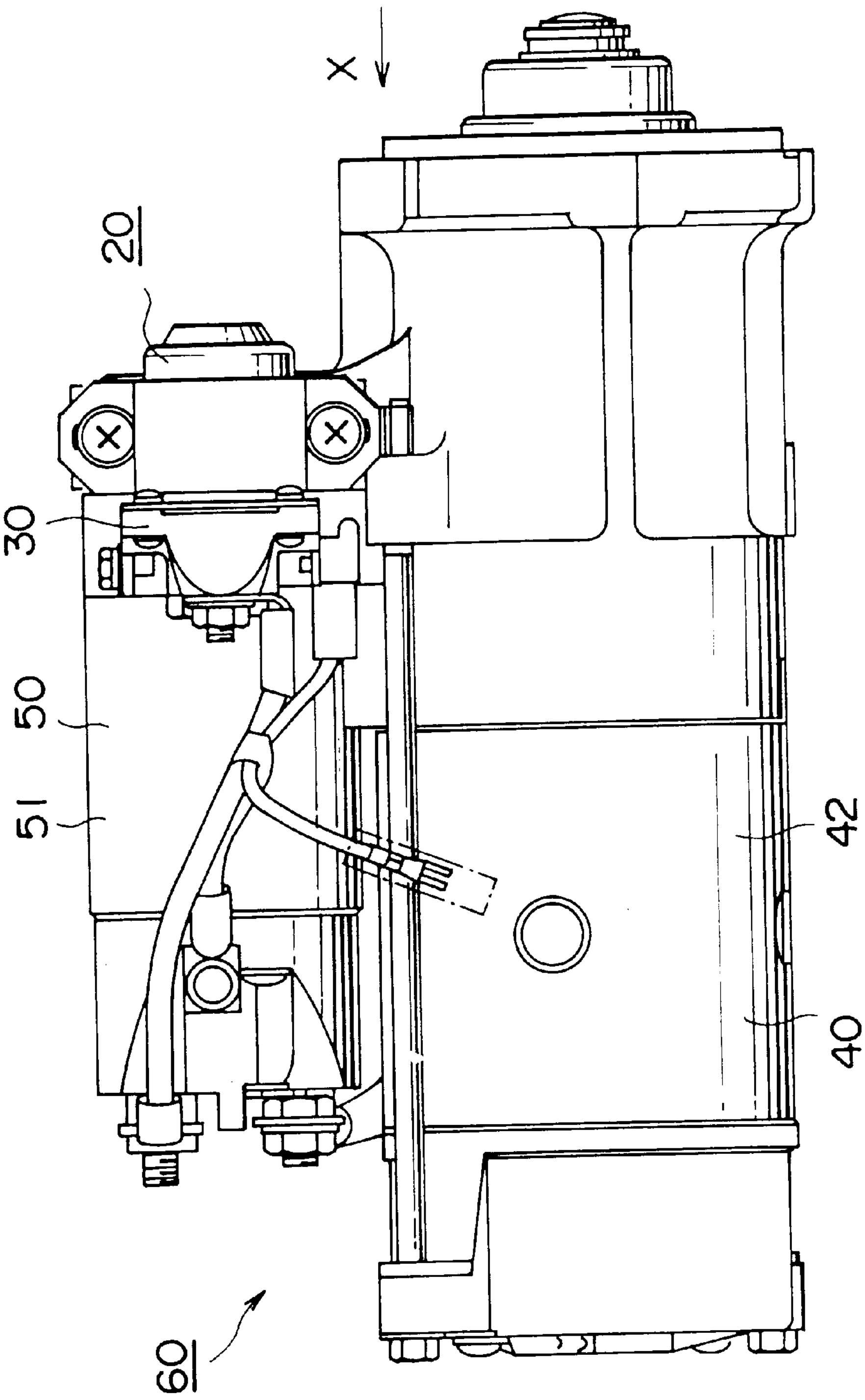
FIG. 7 PRIOR ART
FIG. 7 is a plan view showing a construction of a starter fitted with a conventional starter protector.
Figure 8:
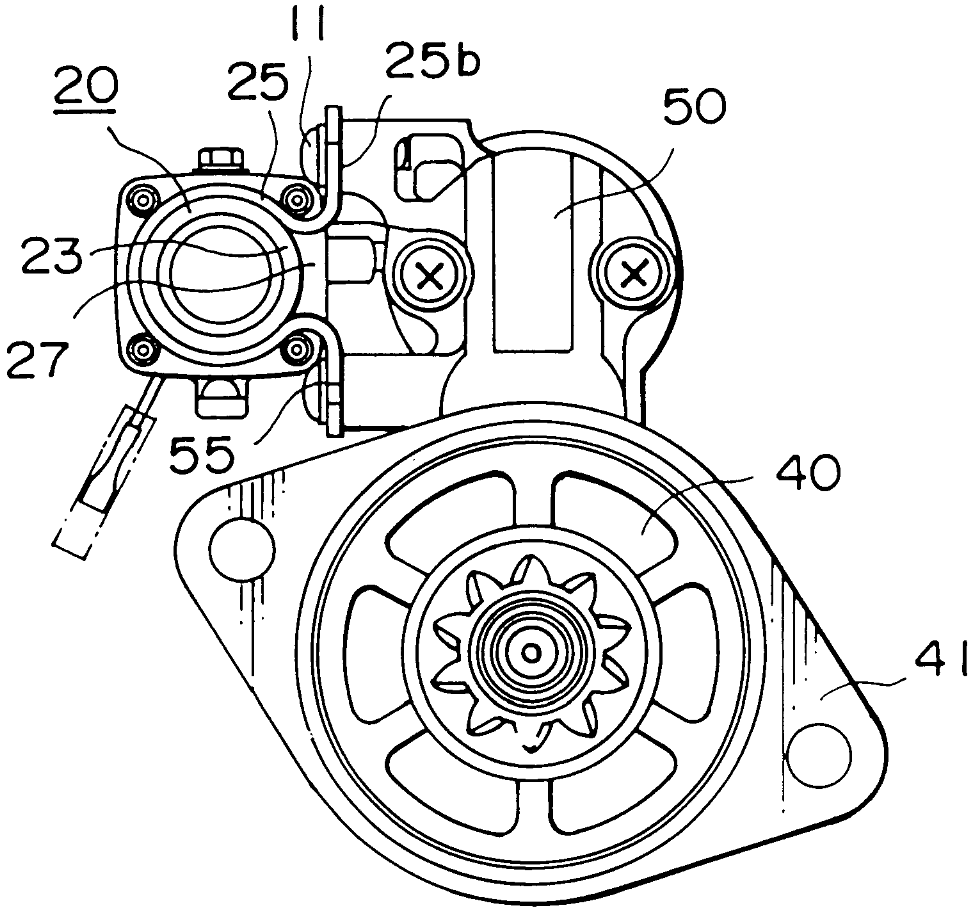
FIG. 8 PRIOR ART
FIG. 8 is a view from the direction of X in FIG. 7.

FIG. 1 is a perspective view showing a starter protector 100 which is an embodiment of the present invention. FIG. 2 is a view from the direction of Y in FIG. 1. FIG. 3 is a perspective view from the direction of Z in FIG. 2. Parts and portions the same as or similar to those in FIGS. 4 to 8 will be given the same numerals and duplicate explanations will be omitted.

In FIG. 1, an approximately cylindrical housing 123 accommodating a magnetizing coil 21, within has a flange 123*a* at one end and is fastened through the flange 123*a* by means of screw members 126 to a cap 124 accommodating contacts 22 within, comprising an auxiliary switch 120. The auxiliary switch 120 performs an operation of opening and closing a starter main switch 50 (not shown) by means of the magnetizing coil 21 and contacts 22.

A mounting bracket 125 is disposed on the cylindrical outer circumferential surface 123*b* of the housing 123, the main body portion 125*a* thereof extending circumferentially around part of the cylindrical outer circumferential surface 123*b* and being secured to the cylindrical outer circumferential surface 123*b* by welding. A pair of leg portions 125*b* extending substantially parallel to each other from the main body portion 125*a* before turning outwards are disposed on both ends of the main body portion 125*a* of the mounting bracket 125. Flat portions 125*c* having slots 125*d* for securing by screws to the starter as shown in FIG. 2 are disposed on the tips of the leg portions 125*b* extending from the main body portion 125*a*.

A space 127 is formed between the pair of leg portions 125*b* and the auxiliary switch 120, and a protector circuit 130 for opening the auxiliary switch 120 under predetermined conditions is disposed in the space 127. The protector circuit 130 comprises an approximately rectangular parallelepiped case 131 and a flat plate-shaped flange 132 secured to the case 131 by welding. The case 131 is guided by the leg portions 125*b* of the mounting bracket 125 and is positioned between the two leg portions 125*b*. The flange 132 comprises slots 132*a* in both ends, and can be secured to the starter (not shown) together with the leg portions 125*b* of the mounting bracket 125 by means of screws 11 indicated by broken lines in the figures. A timer circuit is formed within the case for terminating the energizing of the magnetizing coil 21 at a predetermined time after a key switch is switched on.

Lead wires 129 drawn from the circuit within the case 131 are disposed on the flat surface on the auxiliary switch 120 side of the case 131 of the protector circuit 130, and the lead wires 129 pass between the mounting bracket 125 and the flange 123*a* and extend to terminals 124*a* disposed on the cap 124.

According to this embodiment, the protector circuit 130 is disposed in a space 127 which is dead space not conventionally used, enabling the provision of a compact starter protector and facilitating mounting onto a starter. Also, the case 131 of the protector circuit 130 is guided and positioned by a pair of leg portions 125*b* of the mounting bracket 125, and the flange 132 is provided which can be secured to the starter together with the leg portions 125*b* of the mounting bracket 125, improving the resistance of the protector circuit to vibrations. In addition, since the case 131 of the protector circuit 130 is guided and positioned by the pair of leg portions 125*b* of the mounting bracket 125, the positional relationship between slots 125*d* in the mounting bracket 125 and slots 132*a* in the flange 132 can be precisely determined, facilitating insertion of screw members into the slots 125*d*, 132*a* in order to secure the starter protector to the starter. Moreover, the protector circuit 130 can be disposed in a position close to the cap 124 having terminals 124*a*, enabling the leads connecting the protector circuit 130 to the terminals 124*a* to be shortened.

The starter protector according to the present invention comprises:

an auxiliary switch for opening and closing a starter main switch;

a mounting bracket for mounting the auxiliary switch onto the starter, having leg portions each having one end secured to the auxiliary switch and the other end extending away from the auxiliary switch forming a space with the auxiliary switch and being capable of being secured to the starter; and a protector circuit disposed in the space formed by the leg portions of the mounting bracket for opening the auxiliary switch under predetermined conditions, and since the auxiliary switch and the protector circuit are not disposed in a line, it is possible to provide a compact starter protector which does not require much space in the axial direction, facilitating mounting onto the starter.

By the starter protector according to the present invention, the protector circuit may comprise a case which is guided and positioned by the leg portions of the mounting bracket, whereby the protector circuit is secured by the mounting bracket, improving the resistance of the protector circuit to vibrations.

By the starter protector according to the present invention, the case may comprise a flange capable of being secured to the starter together with the leg portions of the mounting bracket, whereby the protector circuit can be secured to the starter together with the auxiliary switch, further improving the resistance of the protector circuit to vibrations.

By the starter protector according to the present invention:

the auxiliary switch may comprise a housing;

the mounting bracket may comprise a main body portion extending circumferentially around at least part of the outer circumferential surface of the housing of the auxiliary switch and secured thereto;

the leg portions may be a pair of leg portions extending substantially parallel to each other from the main body portion before turning outwards; and the space may be formed between the pair of leg portions, whereby the protector circuit can be disposed making use of dead space not conventionally used, enabling a compact starter protector to be provided and facilitating mounting onto the starter.

What is claimed is:

1. A starter protector for use together with a starter for preventing excessive generation of heat by the starter and for preventing reactivation of the starter when an engine or the starter is rotating under inertia or while the engine is running, said starter protector comprising:

an auxiliary switch for opening and closing a starter main switch;

a mounting bracket for mounting said auxiliary switch onto the starter, having leg portions each having one end secured to said auxiliary switch and the other end extending away from said auxiliary switch forming a space with said auxiliary switch and being capable of being secured to the starter; and a protector circuit positioned in parallel with said auxiliary switch and disposed in said space formed by said leg portions of said mounting bracket for opening said auxiliary switch under predetermined conditions.

2. A starter protector for use together with a starter for preventing excessive generation of heat by the starter and for preventing reactivation of the starter when an engine or the starter is rotating under inertia or while the engine is running said starter protector comprising:

an auxiliary switch for opening and closing a starter main switch;

a mounting bracket for mounting said auxiliary switch onto the starter having leg portions each having one end secured to said auxiliary switch and the other end extending away from said auxiliary switch forming, a space with said auxiliary switch and being capable of being secured to the starter; and a protector circuit disposed in said space formed by said leg portions of said mounting bracket for opening said auxiliary switch under predetermined conditions, wherein said protector circuit comprises a case which is guided and positioned by said leg portions of said mounting bracket.

3. The starter protector according to claim 2, wherein said case comprises a flange capable of being secured to the starter together with said leg portions of said mounting bracket.

4. The starter protector according to claim 3, wherein:

said auxiliary switch comprises a housing;

said mounting bracket comprises a main body portion extending circumferentially around at least part of the outer circumferential surface of said housing of said auxiliary switch and secured thereto;

said leg portions are a pair of leg portions extending substantially parallel to each other from said main body portion before turning outwards; and said space is formed between said pair of leg portions.

5. The starter protector according to claim 2, wherein:

said auxiliary switch comprises a housing;

said mounting bracket comprises a main body portion extending circumferentially around at least part of the outer circumferential surface of said housing of said auxiliary switch and secured thereto;

said leg portions are a pair of leg portions extending substantially parallel to each other from said main body portion before turning outwards; and said space is formed between said pair of leg portions.

6. A starter protector for use together with a starter for preventing excessive generation of heat by the starter and for preventing reactivation of the starter when an engine or the starter is rotating under inertia or while the engine is running said starter protector comprising:

an auxiliary switch for opening and closing a starter main switch;

a mounting bracket for mounting said auxiliary switch onto the starter, having leg portions each having one end secured to said auxiliary switch and the other end extending away from said auxiliary switch forming a space with said auxiliary switch and being capable of being secured to the starter; and a protector circuit disposed in said space formed by said leg portions of said mounting bracket for opening said auxiliary switch under predetermined conditions, wherein said auxiliary switch comprises a housing;

said mounting bracket comprises a main body portion extending circumferentially around at least part of the outer circumferential surface of said housing of said auxiliary switch and secured thereto;

said leg portions are a pair of leg portions extending substantially parallel to each other from said main body portion before turning outwards; and said space is formed between said pair of leg portions.

7. The starter protector according to claim 1, wherein said protector circuit comprises a case with a flange.

* * * * *